United States Patent [19]
Allen et al.

[11] Patent Number: 5,671,777
[45] Date of Patent: Sep. 30, 1997

[54] COUPLINGS FOR JOINING FLUID CONDUITS

[75] Inventors: Daniel M. Allen, Middletown; Richard L. Fahl, Fairfield, both of Ohio

[73] Assignee: Dover Corporation, New York, N.Y.

[21] Appl. No.: 502,746

[22] Filed: Jul. 17, 1995

[51] Int. Cl.⁶ ............................................. F16L 37/28
[52] U.S. Cl. ............................. 137/614.06; 285/322
[58] Field of Search ..................... 137/614.06, 614.04, 137/614.05, 614.02; 285/322, 309, 312, 320

[56] References Cited

U.S. PATENT DOCUMENTS

| | | | |
|---|---|---|---|
| 4,191,406 | 3/1980 | Eaton | 285/322 X |
| 5,078,170 | 1/1992 | Henry | 137/614.06 |
| 5,273,071 | 12/1993 | Oberrecht | 137/614.06 |

*Primary Examiner*—Kevin Lee
*Attorney, Agent, or Firm*—Dinsmore & Shohl

[57] ABSTRACT

A coupling for connecting fluid conduits comprises a coupler and an adapter. The coupler has a frusto-conical seat at its distal end. Fixed and pivotal jaws project beyond the frusto-conical seat and are engageable with a clamping surface on the adapter. A lever operated, cam member swings the pivotal jaw to a position in which the coupler is locked in sealed relation on the adapter. An interlock rod prevents rotation of the lever from this rest position unless the coupler is positioned to be locked on the adapter. The coupler and adapter each comprise normally closed poppet valves. When the operating lever is swung from its rest position to a ready position, the pivotal jaw is swung to its locking position. When the operating letter is swung to a further angular extent, to a full flow position, the coupler poppet is displaced outwardly by a crank/link mechanism. When the coupler poppet is so displaced, it engages the adapter poppet and positions both poppets in open positions, interiorly of an adapter housing passageway. Manual release means require selective actuation for the operating lever to be swung from the rest position to the ready position and to permit the lever to be swung from the ready position to either the rest position or the full flow position.

16 Claims, 11 Drawing Sheets

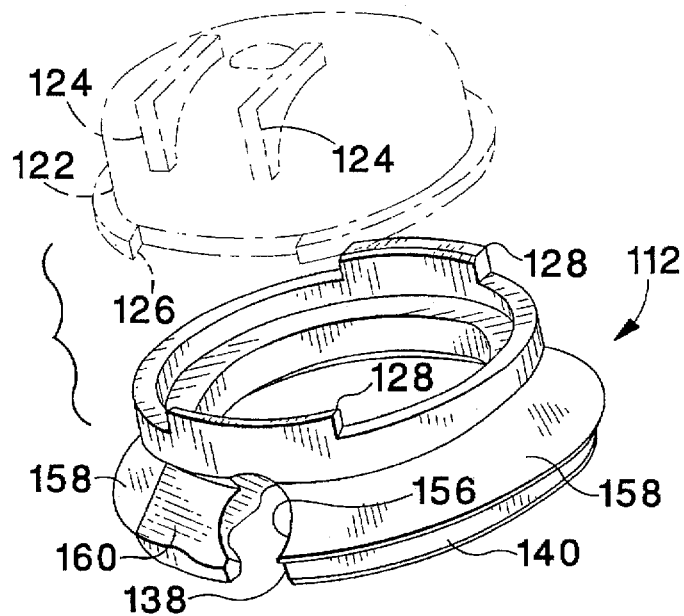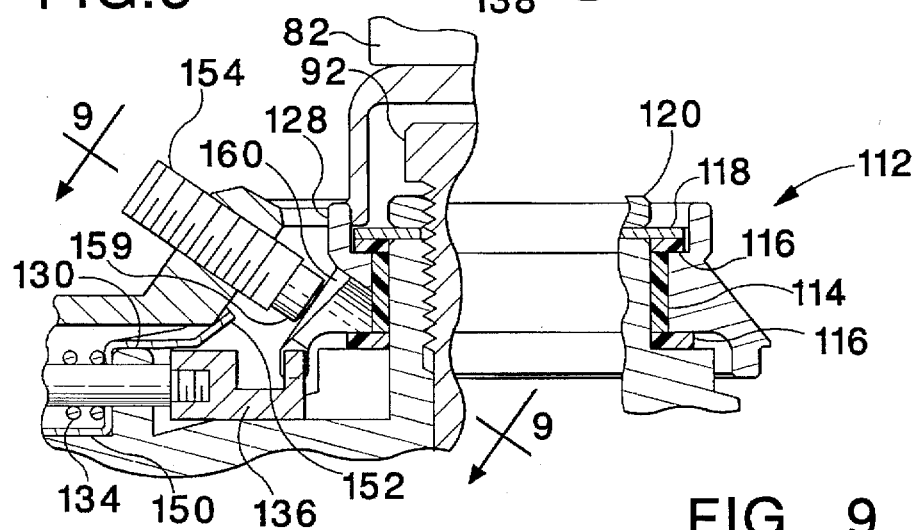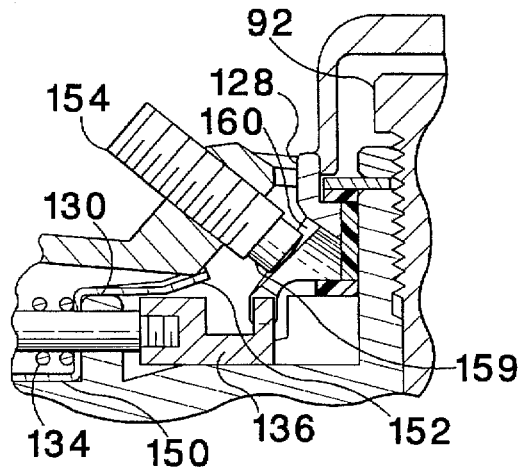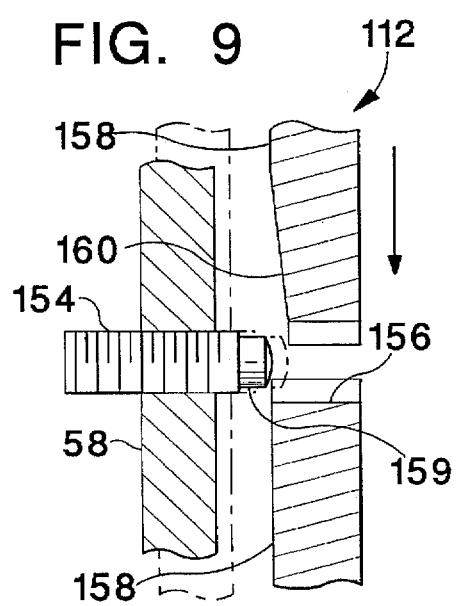

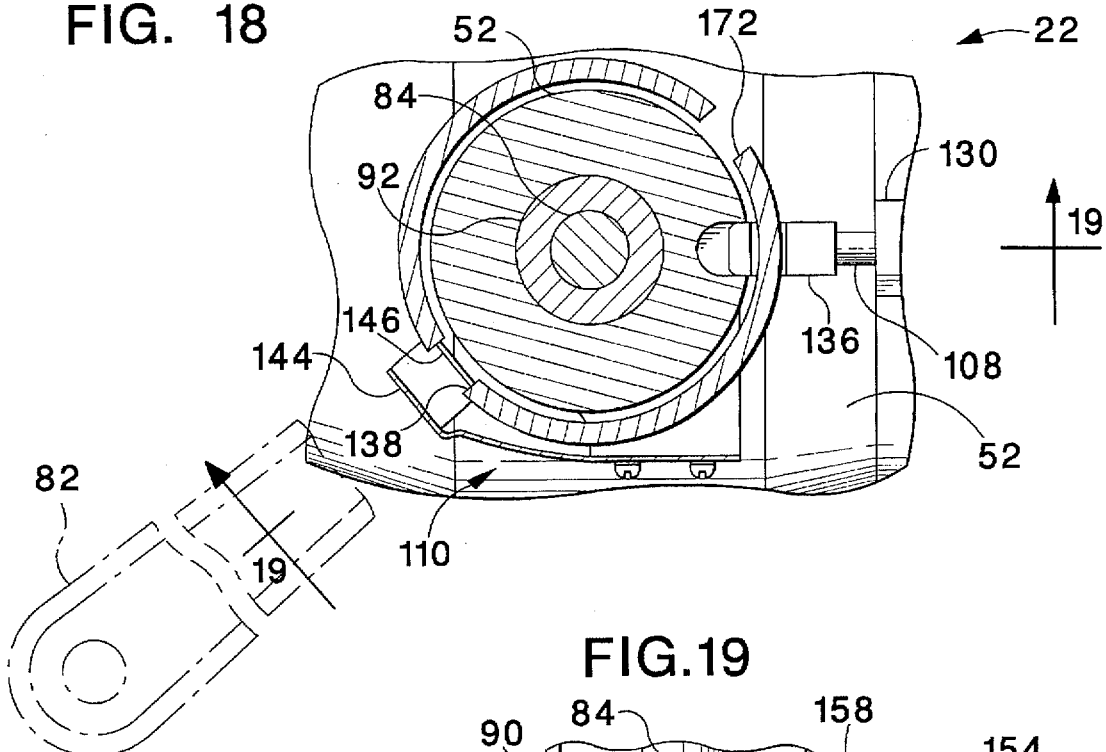
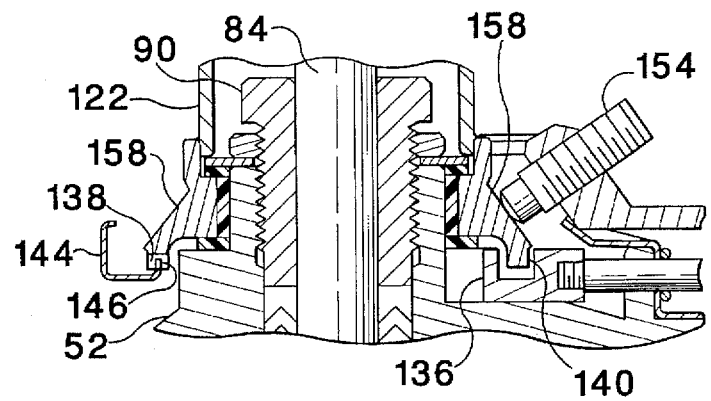
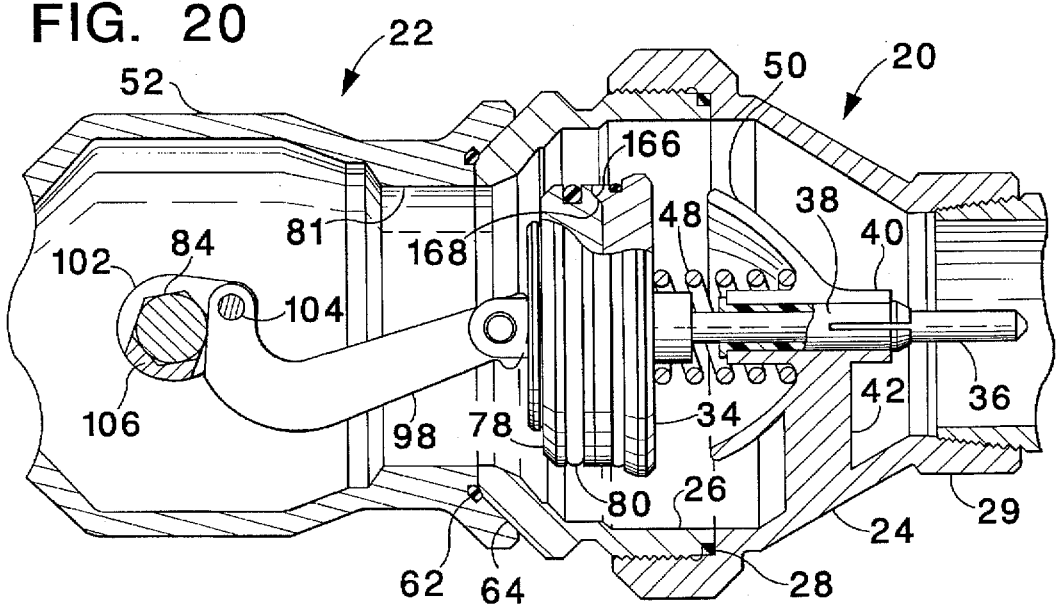

COUPLINGS FOR JOINING FLUID CONDUITS

The present invention relates to improvements in couplings employed in joining fluid conduits and more particularly to couplings comprising two portions, one being generally fixed and referenced as an adapter, with the other portion being referenced as a coupler and, in the usual case, attached to a hose or similar conduit for releasable connection to an adapter. In more specific aspects, the invention relates to such couplings wherein valve means are provided in the coupler and adapter.

Notwithstanding that detachable couplings for fluid conduits are a highly developed art, nonetheless, recognized areas for improvement continue to persist. Further such couplings are marketed in a highly competitive atmosphere, giving particular emphasis to economies in manufacture.

One object of the present invention is to facilitate connection of a coupler to an adapter and provide an improved means therefor.

Another object of the present invention is to improve the valves employed in sealing the passageways of couplers and the fashion in which they are displaced between an open and a closed position.

Another object of the present invention is to provide improved means for sequencing the locking of a coupler in sealed relation on an adapter and in opening the normally closed valves thereof to the end of preventing the opening of a valve under conditions where there would be an undesired discharge of fluid.

Another object of the present invention is to simplify the construction of couplers and minimize the guiding means required for a coupler valve, when it is displaced to an open position.

A further object of the present invention is to achieve the several, foregoing ends in a manner that is economical and less expensive than conventional valves providing similar functions.

In accordance with one object of the invention the foregoing ends may be broadly attained by a coupling coupler adapted to be mounted on a coupling adapter in joining fluid conduits, where the adapter comprises distal end sealing surface means and clamping surface means. The clamping surface means being spaced longitudinally inwardly of the end surface means and facing in a direction generally away from the end surface means.

The coupler, in accordance with this aspect of the invention comprises end surface sealing means adapted to engage the distal end surface means of the adapter, fixed jaw means and pivotal jaw means. When the coupler is positioned relative to an adapter to bring the respective sealing surface means into opposed relation, means may be actuated to swing the pivotal jaw means toward the fixed jaw means and into engagement with the clamping surface means of the adapter. This is done with a force sufficient to firmly clamp the sealing surface means against each other. The pivotal jaw is locked in a position in which the sealing surface means are firmly clamped against each other.

In the usual case the adapter comprises an adapter housing defining a central passageway and connectable to at one end to a first fluid conduit. Such adapter housing will also have annular sealing means at its distal end, and having a frusto-conical clamping surface means facing toward the one end.

The coupler may then comprise a coupler housing defining a central passage, and connectable at one end to a second fluid conduit. Said coupler housing also having annular sealing means at its distal end.

The coupler also includes fixed jaw means disposed laterally of the end surface sealing means, projecting longitudinally beyond the end surface sealing means, and engageable with the clamping surface means of the adapter. The coupler further has pivotal jaw means projecting longitudinally beyond the end surface sealing means, disposed laterally of the end surface sealing means in generally opposed relation to the fixed jaw means, and engageable with the clamping surface means of the adapter.

The coupler is positionable relative to an adapter to bring the respective sealing surface means into opposed relation, and the fixed jaw means into generally contiguous relation with the clamping surface means. When the coupler is so positioned, means are actuated to swing the pivotal jaw means into engagement with the clamping surface means of the adapter, with a force sufficient to firmly clamp the sealing surface means against each other, and then lock the pivotal jaw in a position in which the sealing surface means are firmly clamped against each other.

Where the sealing means of the adapter comprise an outwardly facing, frustoconical surface defining the distal end of the adapter, the pivotal jaw is mounted to be cammed outwardly by such frusto-conical end surface in response to movement of the coupler toward a position in which the sealing means are juxtaposed. This is done with the fixed jaw engaging the clamping surface of the adapter. The coupler may thus be generally aligned with the adapter and positioned to be locked thereon.

In accordance with another aspect of the invention, the adapter further comprises a normally closed valve for the adapter housing passageway. The coupler also comprises a normally closed valve for the coupler housing passageway, and means, operative when the pivotal jaw is in a locked position, for displacing the coupler and adapter valves between an open and a closed position.

Another feature of the invention is found the use of means for displacing the coupler poppet outwardly of the coupler passageway to a position interiorly of the adapter passageway. In so doing, the coupler poppet engages and displaces the adapter poppet to an open position that is also inwardly of the adapter.

A further feature of the invention is found in the provision of interdigitating means on the opposed, distal end faces of the adapter and coupler poppets. As the coupler poppet displaces the adapter poppet, the coupler poppet is laterally positioned by journal means for an adapter poppet stem. By so guiding the coupler poppet, the mounting means for the coupler poppet and the coupler construction are simplified.

In accordance with other aspects of the invention the means for swinging the pivotal jaw means and locking the pivotal jaw and the means for displacing the coupler and adapter valves comprise a lever pivotally mounted for movement successively from a rest position, to a ready position to a full flow position. In the rest position the pivotal jaw may be freely swung to enable mounting of the coupler on the adapter, and the coupler valve is in a closed position. In the ready position, the pivotal jaw is in its locked position, and the coupler valve is in its closed position. In the full flow position the pivotal jaw is in a locked position the coupler valve is in a fully open position.

The coupler may further comprise interlock means for maintaining the lever in its rest position. The interlock means are also responsive to the coupler being mounted on the adapter with the sealing means thereof in juxtaposed relation, to release the lever and permit it to be swung to its ready position.

In accordance with other aspects of the invention, the coupler further comprises a shaft spanning the coupler passageway and pivotally mounted on the coupler housing. The shaft has a portion projecting to the exterior of the coupler housing, with the lever being mounted on the projecting portion. The coupler valve also comprises a coupler poppet, and a bore in the coupler housing, providing a seat of finite length, that is engaged by the coupler valve poppet. Additionally, the means for displacing the coupler and adapter valves between open and closed positions comprise a crank arm mounted on the shaft and a link connecting said bell crank and coupler valve poppet. The crank arm has a position to one side of a longitudinal axis of the coupler housing in the rest position of the lever. The crank arm swings away from the distal end of the coupler as the lever is swung from its rest to its ready position and toward the distal end of the coupler as the lever is swung toward its full flow position.

The crank arm feature for displacing the coupler poppet finds advantages in being used with the referenced interdigitating means for laterally positioning the coupler valve poppet.

The above and other related objects and features of the invention will be apparent from a reading of the following description of a preferred embodiment, with reference to the accompanying drawings, and the novelty thereof pointed out in the appended claims.

In the drawings:

FIG. 7 is a perspective view, on an enlarged scale, of a ramp component seen in FIG. 2, a handle element is also shown in phantom and in exploded relation;

FIG. 8 is a longitudinal section, in a direction opposite to that of FIG. 2, on an enlarged scale, of a portion of means employed in clamping the coupler onto the adapter;

FIG. 8A is the longitudinal section of FIG. 8, with a pivoted clamp member in a position to be cammed to a locked position;

FIG. 9 is a development, taken generally on line 9—9 in FIG. 8, illustrating engagement of a pivoting member with the ramp component;

FIG. 18 is a section taken generally on line 18—18 in FIG. 12;

FIG. 19 is a section taken generally on line 19—19 in FIG. 18; and

FIG. 20 is a section taken generally on line 20—20 in FIG. 12.

Figure 1:
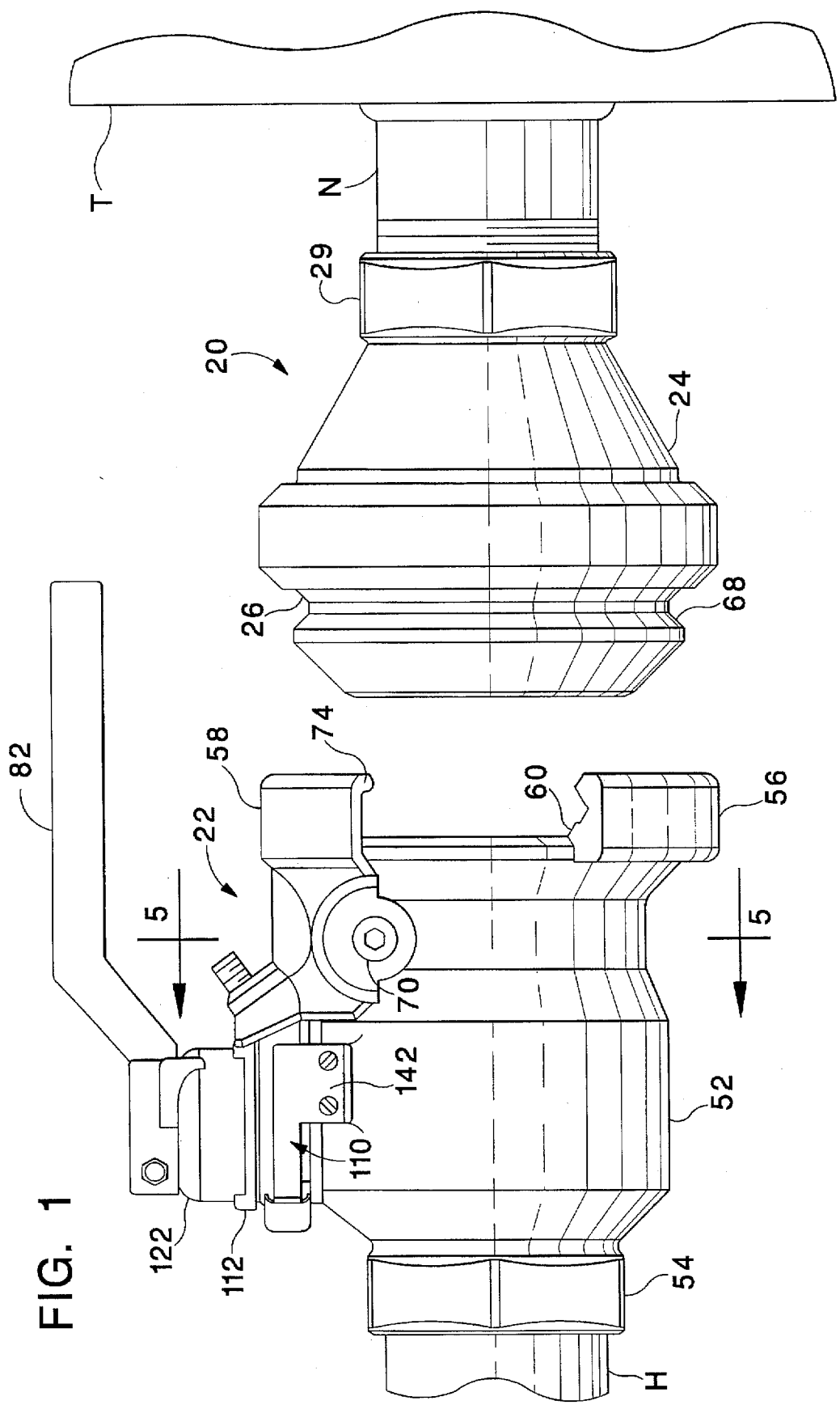
FIG. 1 is an elevation of a coupling embodying the present invention and comprising a coupler positioned preliminary for connection to an adapter.
Figure 2:
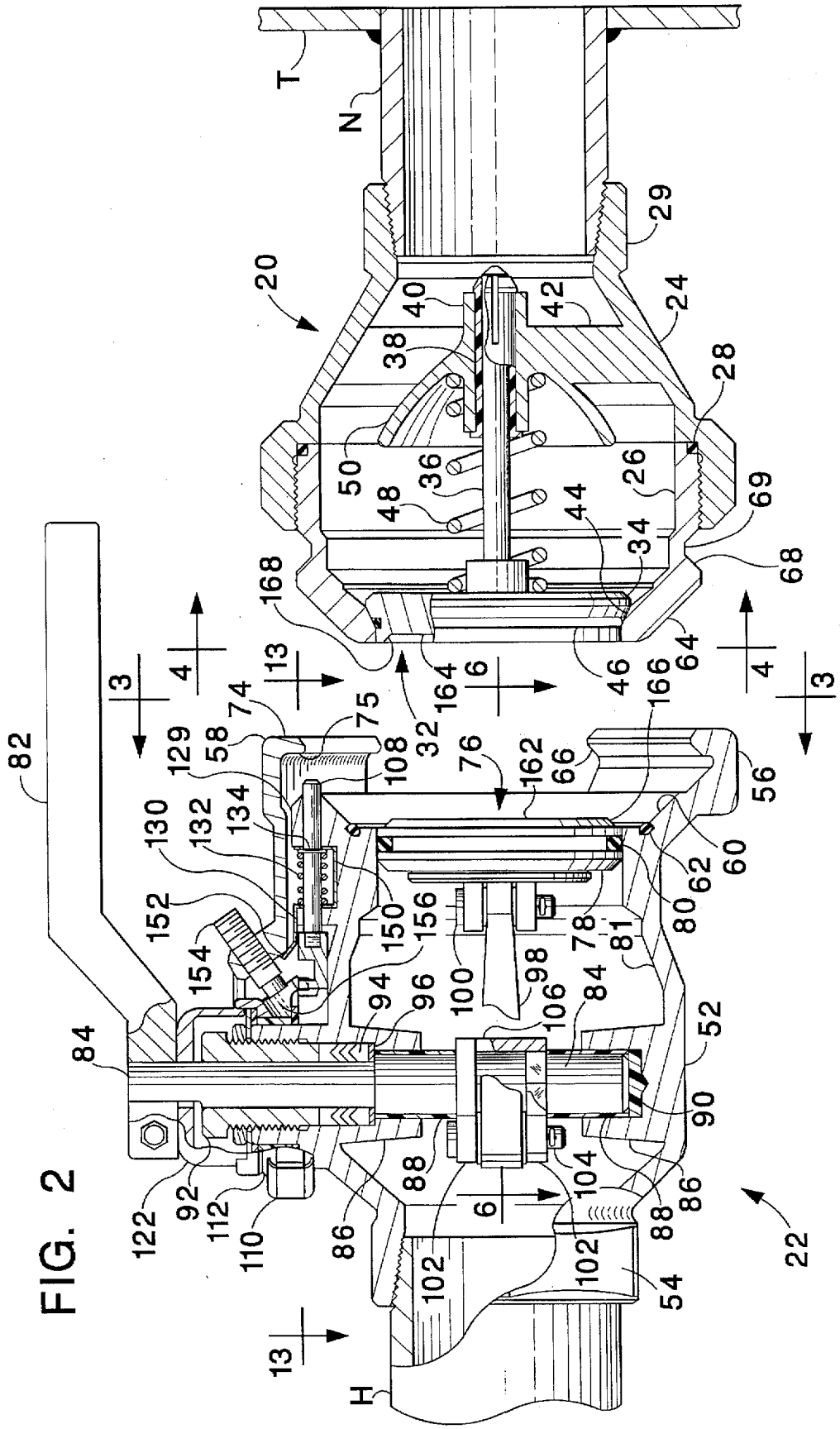
FIG. 2 illustrates the coupling, as seen in FIG. 1, in longitudinal section.

Reference is first made to FIGS. 1 and 2, which illustrate a typical installation of the coupling of the present invention. The coupling comprises an adapter 20 and a coupler 22. The adapter 20 may be used to provide an outlet connection for liquid storage tank T, by way of a short nipple N that projects from the tank wall. The coupler is mounted on a hose H, or other appropriate conduit, to enable transfer of liquid (or other flowable material) from the tank T to another receptacle or point of end use.

At this point, a brief diversion will be made to point out that flow of material can be in either direction through the coupling, when the coupler is mounted on the adapter. Likewise, it is possible for the coupler to be the mounted on the tank nipple and to become the fixed member of the coupling, when the adapter is mounted a hose. In usual practice, there will be a plurality of tanks and a lesser number of hoses that are selectively connected thereto. The adapter is a less expensive unit than the coupler and, for that reason, is employed as the fixed member of the coupling. Also, the portion of the coupling mounted on the hose is, generally speaking, subject to more abuse than the fixed portion. The coupler, being the female portion of the coupler has mating surfaces that are less vulnerable to abuse. These several factors have lead to its being a custom of the trade to employ adapters as the fixed portion of a coupling and the couplers as the hose mounted portions of a coupling.

The adapter 20 is an assembly that is mounted on the nipple N as a unit and, in case of a need for repair or replacement, can be removed therefrom simply by unthreading it from nipple N. The adapter comprises a compositely formed adapter housing formed by a first housing member 24 and a second housing member 26 threaded therein and sealed thereto by an O-ring 28. The inner end of the housing member 24 is provided with a torquing portion 29 that enables a wrench to tighten the adapter on the nipple N.

A self closing valve 32 (FIG. 2) seals the distal end of the adapter 20. The valve 32 comprises a disk, or poppet, 34 having a longitudinal shaft 36 that extends inwardly and is guidingly received by a bearing 38. The bearing 38 is mounted in a hub 40 that is supported by spider legs 42 that extend inwardly from the first housing 24. The bearing 38 has flanges, at its opposite ends, to axially position it with respect to the hub 40 and is slotted at one end to facilitate mounting of the bearing 38 on the hub 40. The bearing 38 is preferably formed of a Teflon (polytetraflouroethylene) carbon polymer to minimize friction with the valve shaft 36 and also to minimize degradation when highly corrosive liquids are handled.

The second housing member 26, at its distal, interior end, provides a seat 44 for the valve poppet 34 and particularly an O-ring 46. A spring 48 acting between the disk 34 and the spider legs 42 yieldingly maintains the valve 32 in a closed position. A bell shaped dome 50 extends in a distal direction from the spider legs 42 to minimize flow losses as liquid flows outwardly from the tank T. It will be readily appreciated that the two piece housing construction (24, 26) facilitates mounting of the components of the valve 32.

The coupler 22 comprises a housing 52 that is threaded at its inner end and provided with a torquing section 54 to facilitate attachment of the coupler 22 to the hose H. The coupler comprises (a) locking means for effecting a mechanical connection with the adapter 20, (b) a coupler valve and (c) means for sequencing operation of the locking means and the coupler valve, which will be described in the stated order.

Figure 3:
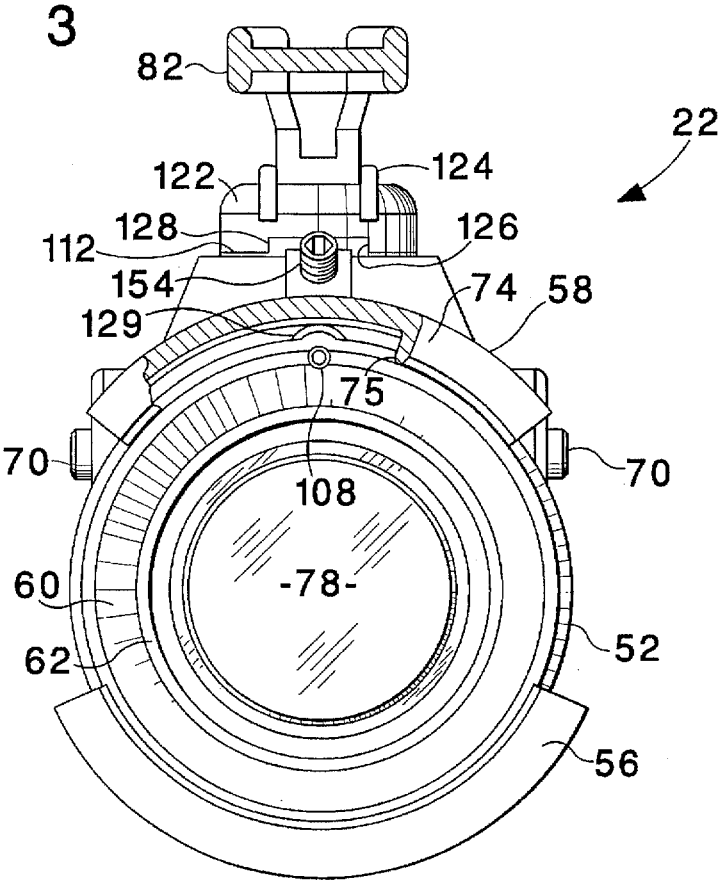
FIG. 3 is an end view of the coupler, taken on line 3—3 in FIG. 2.
Figure 4:
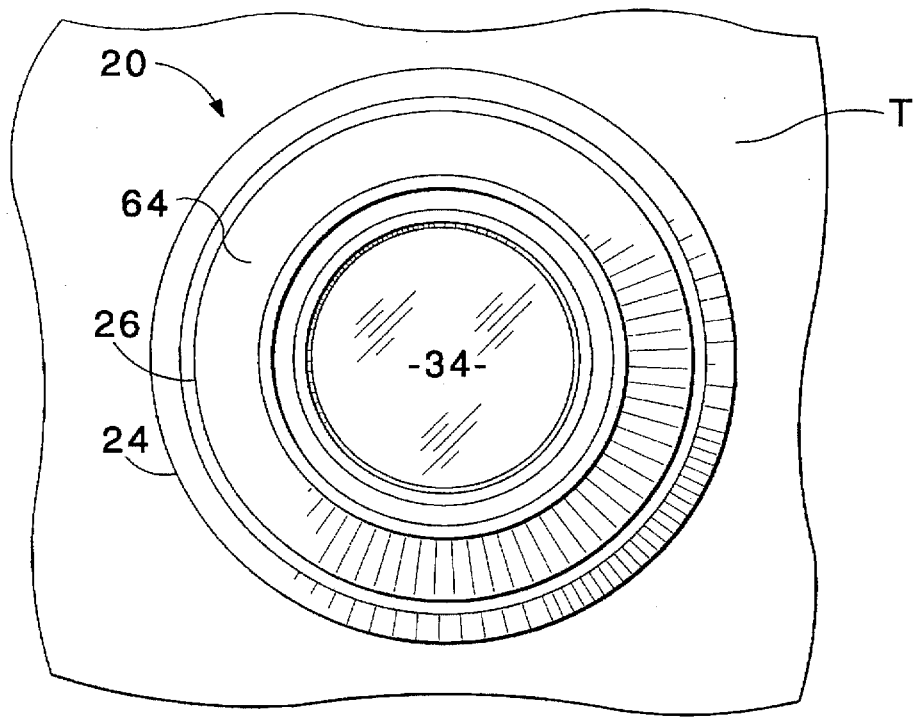
FIG. 4 is an end view of the adapter, taken on line 4—4 in FIG. 2.

The locking means comprise a fixed jaw 56 and a pivoted jaw 58 (see also FIG. 3). The distal end of the coupler housing is provided with a frusto-conical seat 60, at the base of which is an O-ring 62. The seat 60 is adapted to engage a corresponding frusto-conical surface 64 on the distal end of the adapter 20. The jaw 56 is provided with a frusto-conical surface 66, which is adapted to engage a frusto-conical surface 68, that partially defines a circumferential groove 69 on the outer diameter of the second adapter housing 26.

Pivotal mounting of the jaw 58 is provided by shoulder screws 70 (see also FIGS. 1 and 5) that are threaded into bosses 72, which extend laterally from the coupler housing 52. The portion of the locking jaw 58, which projects outwardly of frusto-conical seat 60 is in the form of an arcuate segment having an inwardly projecting lip 74, which terminates in an arcuate edge 75 having a radius that generally approximates the mean diameter of the adapter groove surface 68. When the fixed jaw 56 and the pivoted jaw 58 are fully engaged with the adapter jaw surface 68 (reference FIG. 11) the coupler 22 is locked on and sealed with respect to the adapter 20, as will be more fully described below.

The coupler valve is generally identified by reference character 76 and comprises a disk, or poppet, 78 having a circumferential O-ring 80 that sealingly engages a bore 81 in the coupler housing 52. Although the details are not shown, the disk 78 is compositely formed to facilitate the use of an O-ring 80 Teflon (polytetraflouroethylene), or other low friction material, and thus obtain a low resistance to sliding movement of the disk, as well as resistance to chemical attack.

Figure 12:
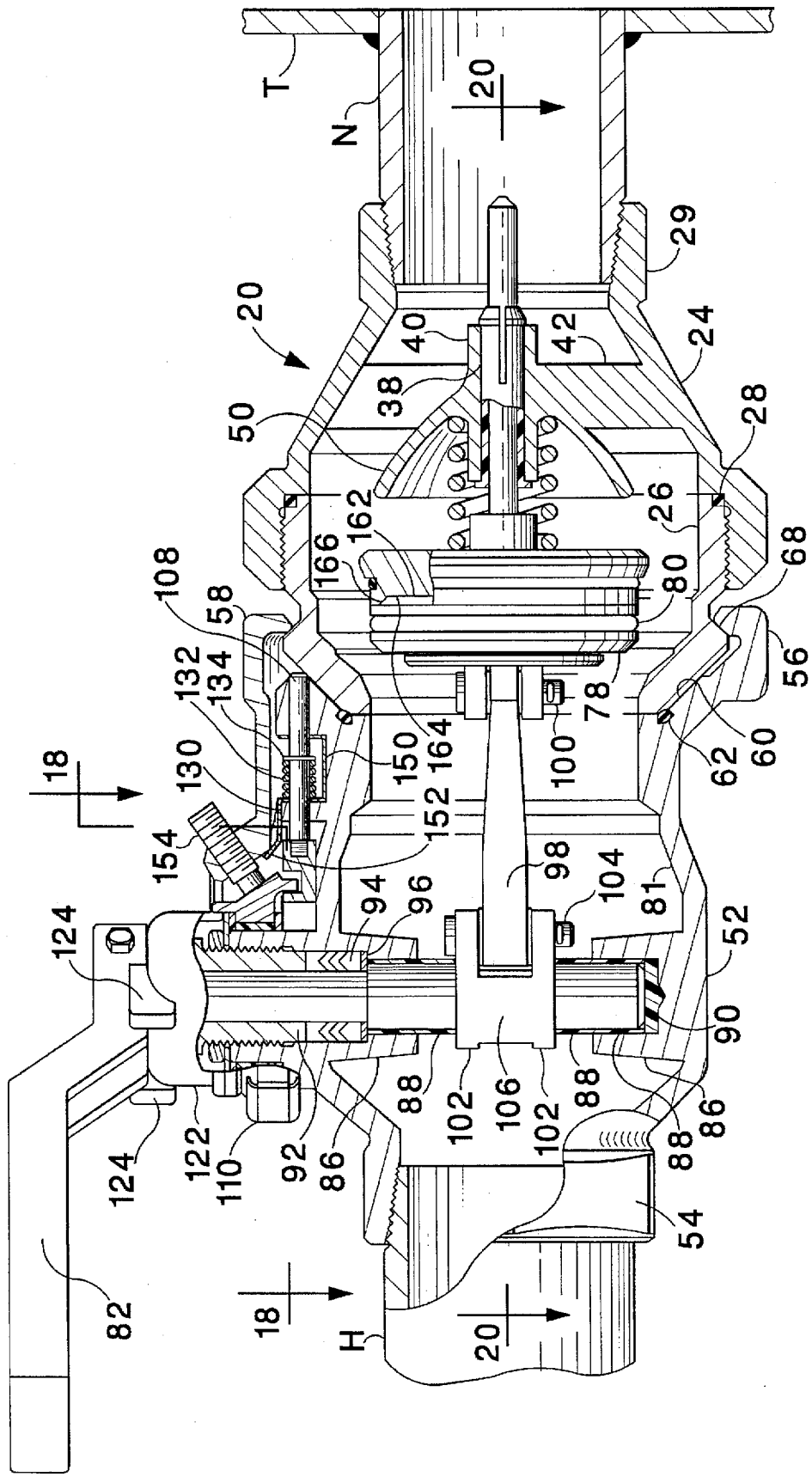
FIG. 12 is a longitudinal section of the coupling, illustrating the coupler locked onto the adapter, with the valves therefor in their open positions.

When the coupler 22 is locked onto the adapter 20, the sealing disk is manually projected from the sealing position in FIG. 2 to an open position and, in being so projected, also displaces the adapter poppet 34 to an open position (reference FIG. 12). Movement of the coupler valve poppet is controlled by a lever 82 that is secured to the upper end of a shaft 84, which is, preferably, vertically disposed. The shaft 84 is journaled on internal bosses 86 formed on the coupler housing 52 by bearing bushings 88. The lower end of the shaft 84 is supported by an anti-friction disc 90. The bushings 88 and disc 90 are preferably formed of a Teflon (polytetraflouroethylene) resin and may be modified with carbon additives to provide a minimized coefficient of friction as well as a resistance to attack by corrosive liquids that are commonly encountered in the use of couplings of this type. A hollow screw 92 is threaded into the coupler housing 52 and compresses a packing 94 against a washer 96 to provide a rotary seal between the housing 52 and the shaft 84.

Figure 5:
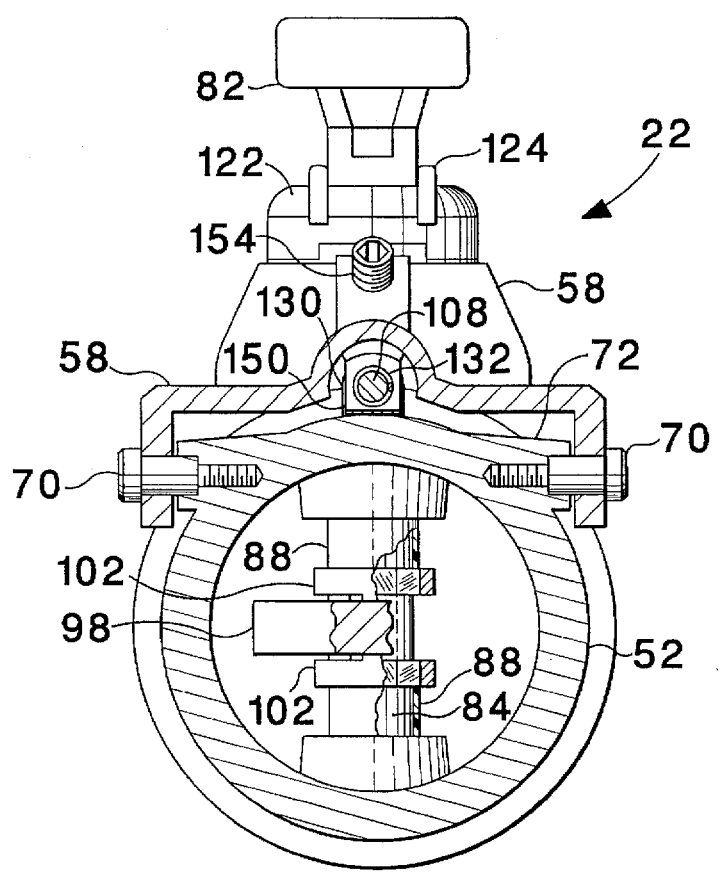
FIG. 5 is a section taken generally on line 5—5 in FIG. 1.
Figure 6:
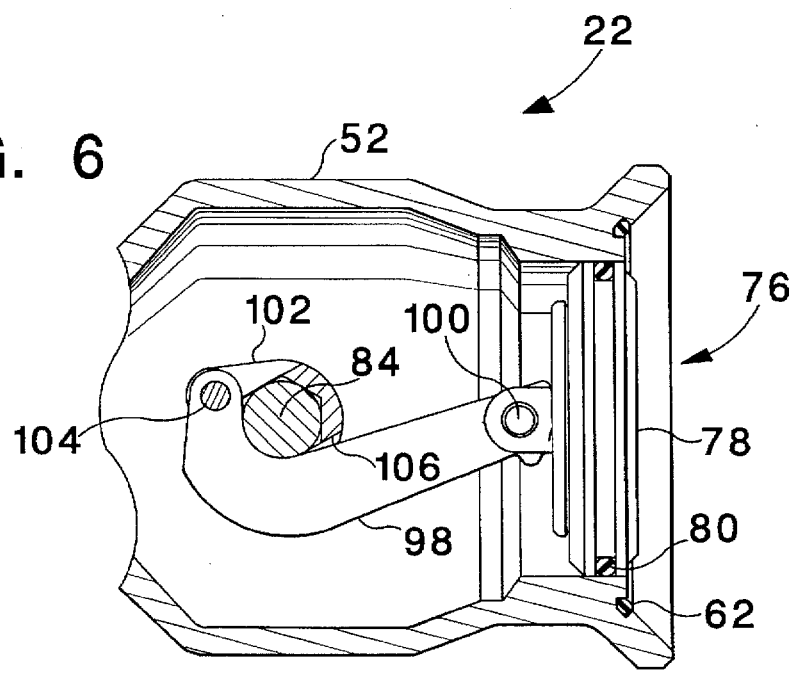
FIG. 6 is a section taken generally on line 6—6 in FIG. 2.

Rotary movement of the shaft 84 is translated into longitudinal movement of the valve poppet 78 by a link 98 (see also FIGS. 5 and 6). One end of the link 98 is connected to a clevis on the poppet 78 by a pin 100. The opposite end of the link 98 is connected to bell crank arms 102 by a pin 104. The arms 104 are interconnected by an integral web 106. At this point it will be noted that the shaft 84, in accordance with a preferred feature of the invention, was formed from a length of hexagonal cross section rod, which was turned down to form the journaled portions of the shaft. The remaining hexagonal portions are received by corresponding hexagonal openings in the crank arms 102 to provide a drive connection therebetween.

Figure 13:
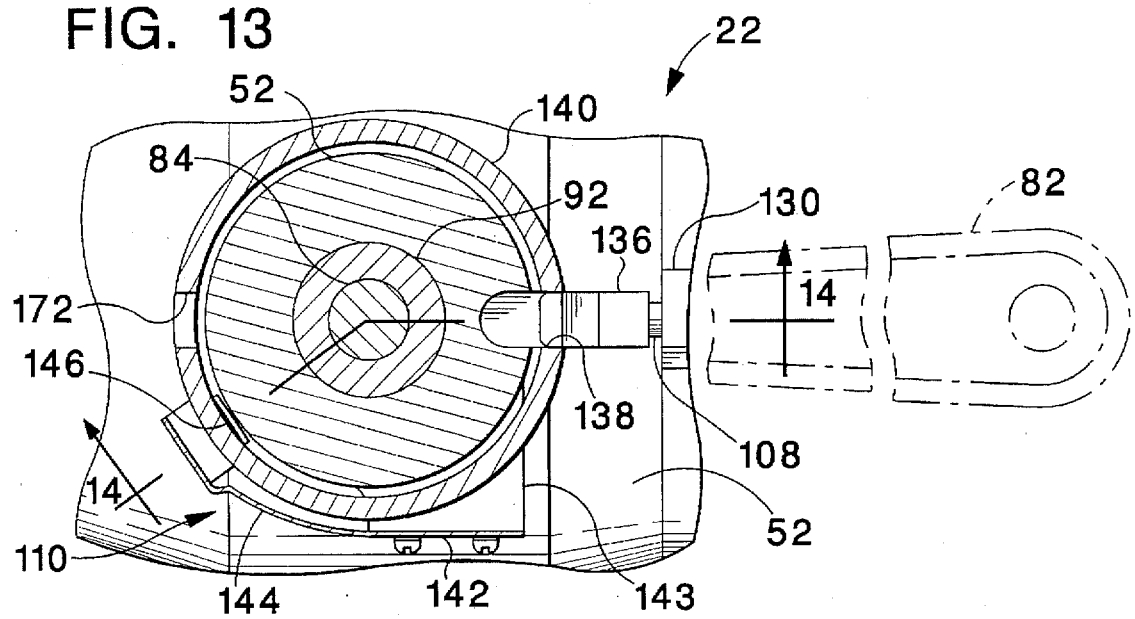
FIG. 13 is a section taken generally on line 13—13 in FIG. 2.
Figure 14:
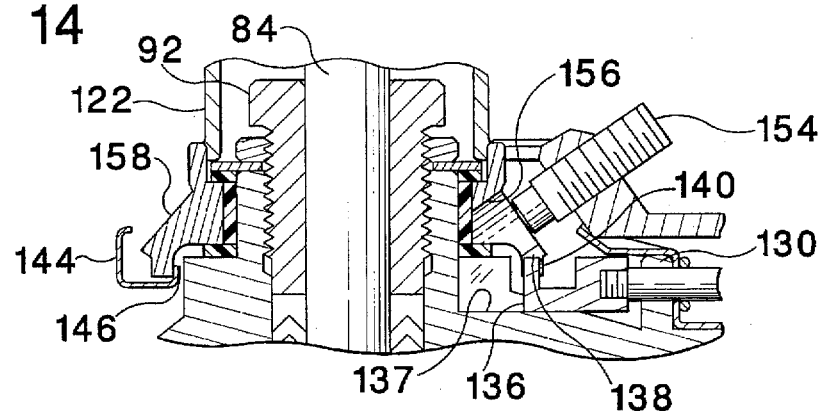
FIG. 14 is a section taken generally on line 14—14 in FIG. 13.

The means for sequencing operation of the clamping means and opening/closing of the coupler valve 76 comprise an interlock pin 108 and a manual release 110 (FIGS. 2, 13 and 14). Both of these means are effective in controlling rotation of the lever 82 as it is swung successively from i. a rest position (FIG. 2) in which the pivotal jaw is free to swing to a position permitting mounting of the coupler on the adapter and in which the coupler valve is closed, to ii. a ready position (FIG. 11) in which the pivotal jaw is locked in a position maintaining the coupler in sealed relation on the adapter and the coupler and adapter valves are closed, to iii. a full flow position (FIG. 12) in which the pivotal jaw is locked in a position maintaining the coupler in sealed relation on the adapter and coupler and adapter valves are in open positions.

Both the interlock pin 108 and the manual release 110 cooperate with a lever hub extension 112 (see also FIGS. 7 and 8), which is disposed beneath the lever 82, concentrically of the shaft 84. The hub extension 112 is rotatably mounted relative to the housing boss into which the hollow screw 92 is threaded. The annular, hub extension 112 in mounted on a bearing bushing 114 (FIG. 8), which is disposed between vertically spaced anti-friction discs 116. The discs 116 and bushing 114 may, advantageously be formed of glass filled, polytetraflouroethylene, or similar material. The bushing 114 and discs 116 would be assembled on the housing boss prior to the hollow screw being threaded in place (which would occur after the shaft 84 had been placed in its assembled position). Additionally, a washer 118 would be placed above the upper disc 116 and a nut 120 threaded onto the hollow screw, before the screw is threaded into the housing boss. Once these components are assembled, the nut 120 is tightened to secure the journal components for hub extension 112. The nut 120 also functions as a lock nut to prevent the hollow screw 92 from unthreading and a resultant possibility of leakage occurring along the shaft 84.

The hub extension 112 is connected to the lever 82 through a shell like connector 122 (FIGS. 2, 3 and 8), which may be telescoped over the upper end of the shaft 84 before the lever 82 is secured thereto. The lever 82 is then (FIG. 3) disposed between upwardly projecting lugs 124 to facilitate transmission of forces from the lever to connector. The connector 122 has slots 126, on its opposite sides, which receive upstanding lugs 128 from the hub extension 112 to provide for transmission of rotative forces therebetween.

The interlock pin 108 (FIGS. 2 and 3), is disposed longitudinally of the coupler housing 52 and is slidably mounted in a lug 129 at the distal end of the housing 52 (inwardly of the sealing surface 60) and in a second lug 130. A spring 132 acting between the lug 130 and a washer 134, secured to the pin 108, yieldably urges the pin outwardly of the end face of the coupler, as illustrated in FIG. 3. A block 136 (guided by an upwardly open slot 137, FIG. 14, in the housing 52) is provided at the inner end of the interlock rod. A radially extending slot 138 (FIG. 13) is formed in an annular skirt 140, which depends from the hub extension 112 (FIGS. 7 and 13). When the coupler valve 76 is in its closed position, as illustrated in FIGS. 2 and 13, the slot 138 is aligned with block 136.

The interlock block 136 is thus positioned to prevent rotation of the shaft 84 and prevent opening of the coupler valve 76 when the coupler is not coupled to an adapter. This is an important safety factor in that it prevents inadvertent discharge of material from the coupler, when it is not connected to an adapter.

Mounting of the coupler 22 on the adapter 20 will next be described. At this point it will be noted that the pivoted jaw 58 is normally biased in a clockwise direction toward a clamping position by a spring member 150 (FIGS. 1 and 2). The spring member has a U-shaped body portion that is disposed between the lugs 129 and 130 and is apertured so that the interlock pin 108 may pass therethrough. The inward end of the spring member terminates in an upwardly angled tab 152 (see also FIG. 8) that engages an inner surface of the pivoted jaw 58 and yieldingly urges the jaw 58 in a clockwise direction.

A cam screw 154 is threaded through an upper portion of the pivotal jaw 58 and is aligned with an opening 156 in the hub extension 112 (see also FIG. 7). As will soon be apparent, the cam screw functions to securely clamp the coupler onto the adapter.

Figure 10:
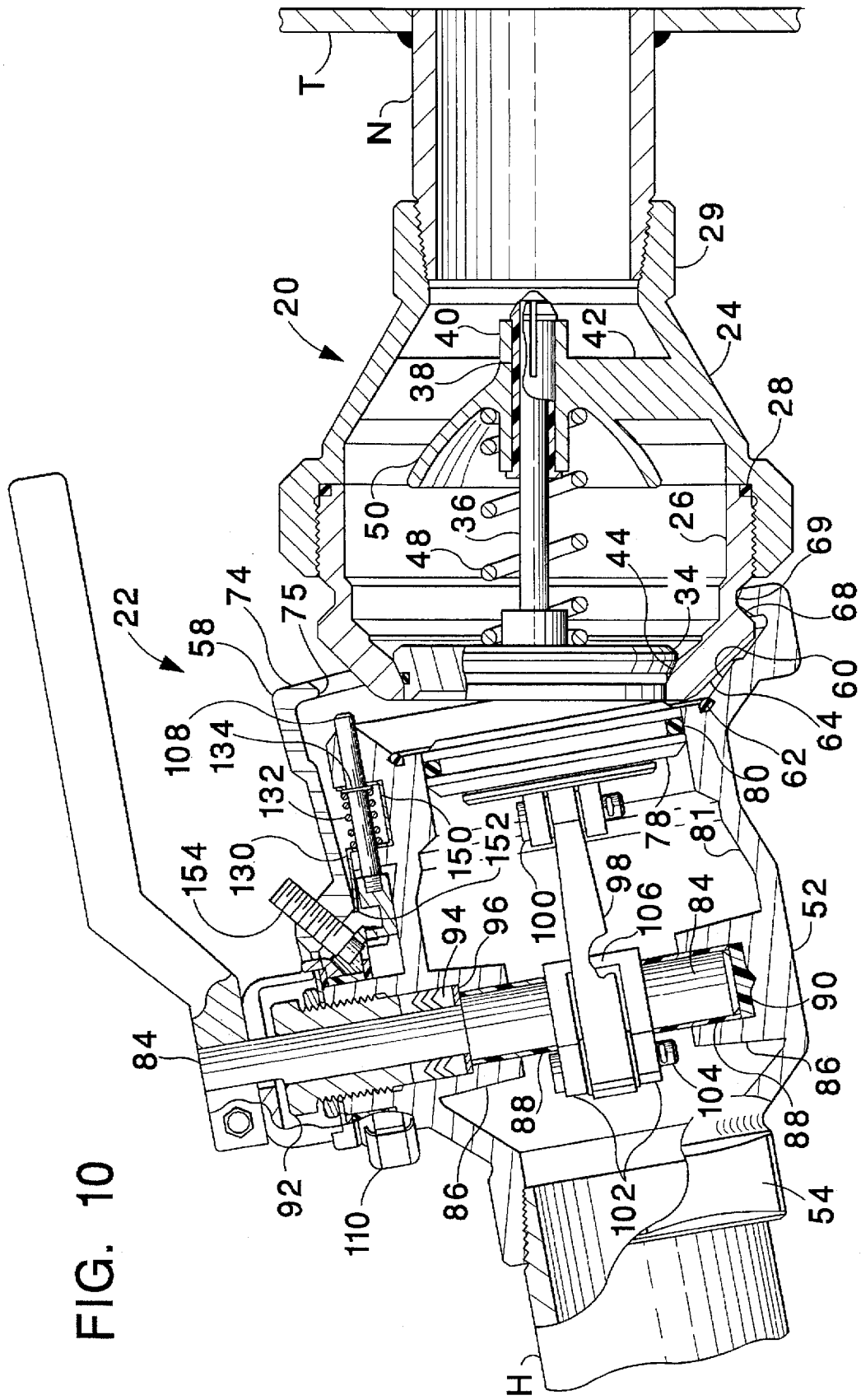
FIG. 10 is longitudinal section of the coupling, illustrating the coupler partially assembled on the adapter.

The frusto-conical distal end (64) of the adapter functions to cam/pivot the jaw 58 as the coupler 22 is forced toward the adapter 20. FIG. 10 illustrates the manner in which it is contemplated that the coupler will be mounted on the adapter. That is, the fixed jaw 56 can be angled and readily engaged with adapter groove 69 that comprises surface 68. The hose end of the coupler can then be pivoted upwardly to provide leverage that functions to cam the pivotal jaw 58 to a position in which it will slide over the major diameter of the frusto-conical portion 64 and then drop into the groove 69. The maximum opening of the pivotal jaw 58 necessary to mount it on the adapter 20 is illustrated in FIG. 10. In viewing FIG. 10, in this connection, it is to be remembered that the angular relationships involved are somewhat complex. This is to point out that contact with the larger diametrical portions of the frusto-conical end portion of the adapter is made by the lower corners of the lip edge 75 (blocked from view in FIG. 10).

When the coupler 22 is further pivoted from the position of FIG. 10, toward a position aligned with the adapter, the outer, lip 74, of the pivotal jaw 58, drops into the adapter groove 69. The action of the lip 74 in dropping into groove 69 is facilitated by the resilient action of spring 150. It will be seen that angled spring tab 152 is deflected to a flat position in FIG. 10. Once the pivotal jaw lip 74 drops into the groove 69, the spring tab 152 pivots the jaw 74, relative to the coupler housing 52, to urge the coupler toward a fully aligned positioned relative to the adapter 20.

Once the coupler 22 has been mounted on the adapter 20, with the jaws 56, 58 engaged in the groove 69, it can be positively locked in sealed relation on the adapter 22, by rotation of the lever 82 in a counterclockwise direction.

It will be noted that, in mounting the coupler 22 on the adapter 20, the interlock pin 108 is displaced rearwardly, into the body portion of the coupler. This movement of the pin 108 displaces the block 136 to a position in which a slot 157 is aligned with the hub extension skirt 140. The block 136 no longer blocks rotation of the hub extension 112 (and shaft 84) thereby permitting rotation of the lever 82 to the ready position illustrated in FIG. 16.

Figure 11:
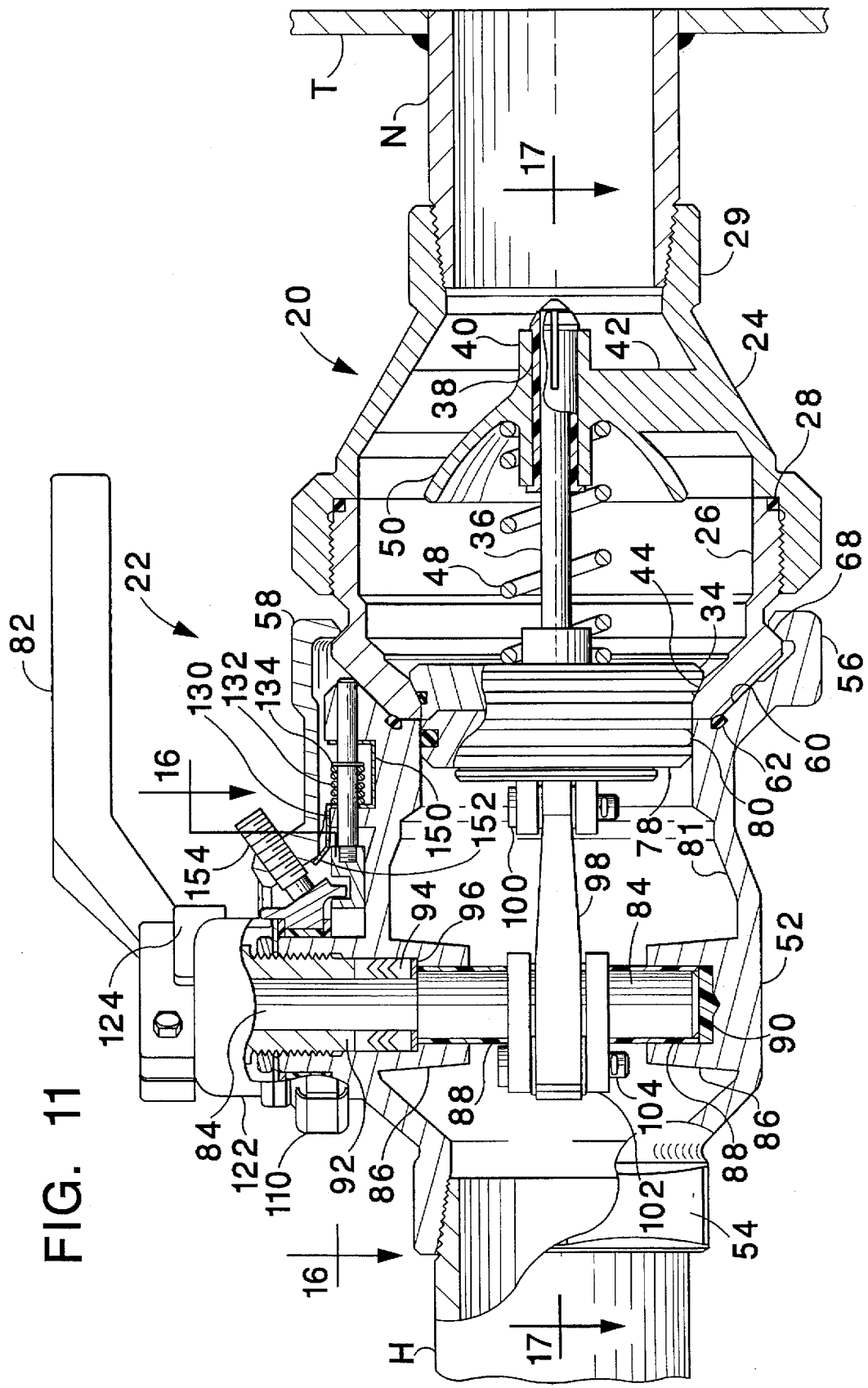
FIG. 11 is a longitudinal section of the coupling, illustrating the coupler locked onto the adapter, with the valves therefor still in their closed positions.

FIGS. 8 and 9 illustrates the pivoted jaw 58 in its locked position (the other components in FIG. 1 are shown in their unlocked positions, i.e., prior to the lever 82 being swung to the locked position of FIG. 11). FIG. 8A illustrates the pivotal jaw 58 in a position it would assume after the coupler has been manually mounted on the adapter. FIG. 9 is a development that illustrates the relationship between the cam screw 154 and a frusto-conical positioning surface 158, formed on the hub extension 112. To one side of the opening 156, there is an angled ramp 160 that progressively increases in distance from the axis of the hub extension, out to the surface 158, which is a fixed distance from the hub extension axis.

The unlocked positions of the pivotal jaw 58 and screw 154 are illustrated by broken lines in FIG. 9. When the lever 82 is first rotated (after the coupler has been mounted on the adapter), the relative movement between the hub extension 112 and the cam screw 154 (indicated by the arrow in FIG. 9) causes the ramp 160 to engage the screw 154, thereby positively displacing the clamp 58 in a direction such that the lip 74 is forced downwardly. As the adapter groove surface 68 is thus engaged by the lip 74, the fixed jaw 56 cooperates to seat the adapter surface 64 in positively sealing engagement with the O-ring 62. The included angle of the ramp is approximately 30 degrees. Once the lever has been rotated a distance sufficient to bring the positioning surface 158 beneath the screw 154, the coupler 22 is fully locked in sealed relation with the adapter 20. At this point, the adapter valve (and with it the adapter valve 32) may be safely opened.

Before proceeding with a description of the manner in which the coupler valve is opened, reference is again made to the "unlocked" position of the pivoted jaw 58, as illustrated in FIG. 8A and indicated by broken lines in FIG. 9. In order for the hub extension to be rotated from its unlocked, rest position, it is necessary that the pivotal jaw be in a position such that the ramp surface 160 can be cammed into under lying relation with the cam screw 154. The spring tab 154 preferably has sufficient force (after the coupler has been manually mounted on the adapter) to pivot the coupler relative to the adapter to attain or maintain an aligned relationship therebetween—the end result being that the minimum acceptable relationship of FIG. 8A (broken lines in FIG. 9) is obtained. "Minimum acceptable" in the present context means that the pivoted jaw 58 is pivoted sufficient to permit the low point of the camming surface 160 to pass beneath the screw 158.

If for some reason the spring tab 152 does not have sufficient strength, it is a simple matter to manually raise the outboard end of the coupler and bring it into closer alignment with the adapter, to the end of the jaw 58 pivoting sufficiently to enable the hub extension 112 to be rotated. Even if the spring 150 should break, it is still possible to position the coupler and apply manual pressure on the jaw 58 to bring it to a position in which the hub extension 112 can be swung to a locking position.

It is to be appreciated that the end position of the pivotal jaw 58, after the hub extension 112 has been rotated to bring the positioning surface 158 under the cam screw 154, is the controlling factor as to magnitude of sealing force between the adapter surface 64 and the sealing ring 60. More precisely the degree of locking force is a function of the distance of the adapter contacting surface 75 (on the pivotal jaw) and the surface of the jaw (end of screw 154) that contacts the positioning surface 158. This distance is controllable by adjusting the screw 154 relative to the jaw 58.

It is also to be noted that the end portion of the screw 154, is in the form of an insert 159 that engages the hub extension 112, is formed of a low friction material having a long lasting wear life. A suitable material providing such function glass filled polytetrachloroflouroethylene.

In all events, the provision of a cam follower to position the pivotal jaw 58, in the form of the screw 154, economically enables manufacturing tolerances to be adjusted for in initially obtaining the desired locking action. Then, during use, as the screw insert and/or the positioning surface 158 are worn and also when the jaw surface 75 and/or the adapter surface 68, become worn, the screw 154 may be threaded toward the hub extension to reestablish the desired locking force.

Reference is again made to the linkage for positioning the coupler valve poppet 78, which was previously described in connection with FIG. 6, and is illustrated in the same relative position in FIG. 15, after assembly of the coupler on the adapter, but before rotation of the lever 82 and shaft 84 to a locking position. This is the position of the adaptor valve 76 when it is not in use in transferring material from (or to) a conduit system provided with an adapter. In this position of the valve, the poppet 78 is locked in a closed position and is essentially immune to external forces, or internal forces, that would cause it be inadvertently displaced to an open position that would permit leakage.

Figure 15:
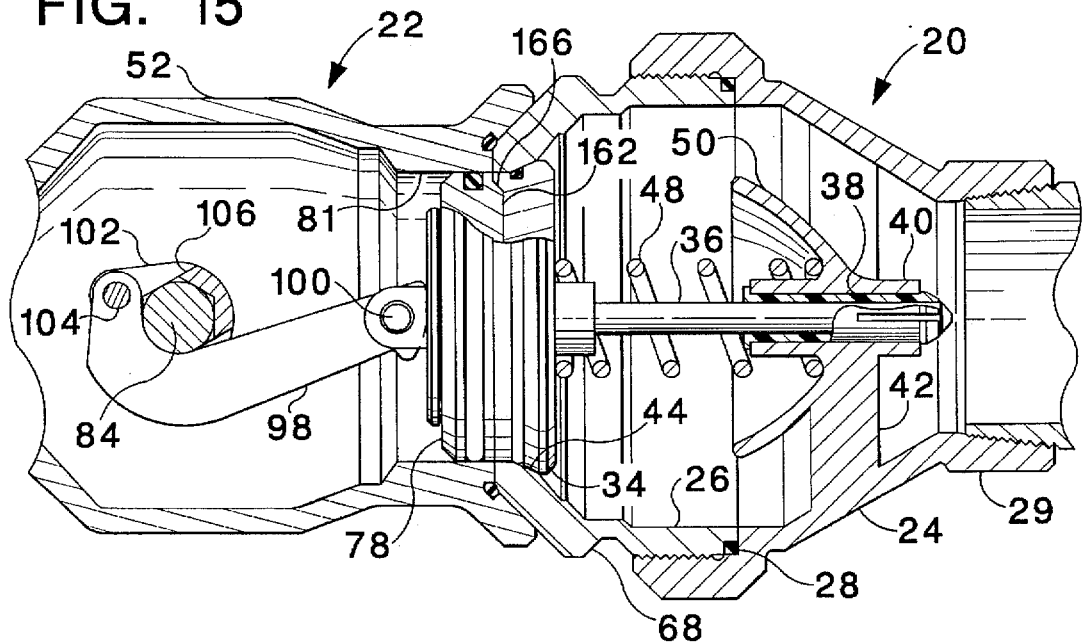
FIG. 15 is a section taken generally on line 6—6 in FIG. 2 and additionally showing the coupler in assembled relation on the adapter, with the adapter also shown in section.

It is to be appreciated that this locked condition of the poppet 78 is not affected by the act of mounting the coupler 22 on the adapter 20, as shown in FIG. 15.

It is also desirable that the valve poppet 78 be axially positioned so that it will not contact the adapter poppet 34, when the coupler 22 is mounted on and locked with respect to the adapter 20. Otherwise, there is the possibility of the adapter poppet 34 being prematurely displaced to an open position, i.e., before the coupler is fully locked in sealed relation on the adapter.

Figure 16:
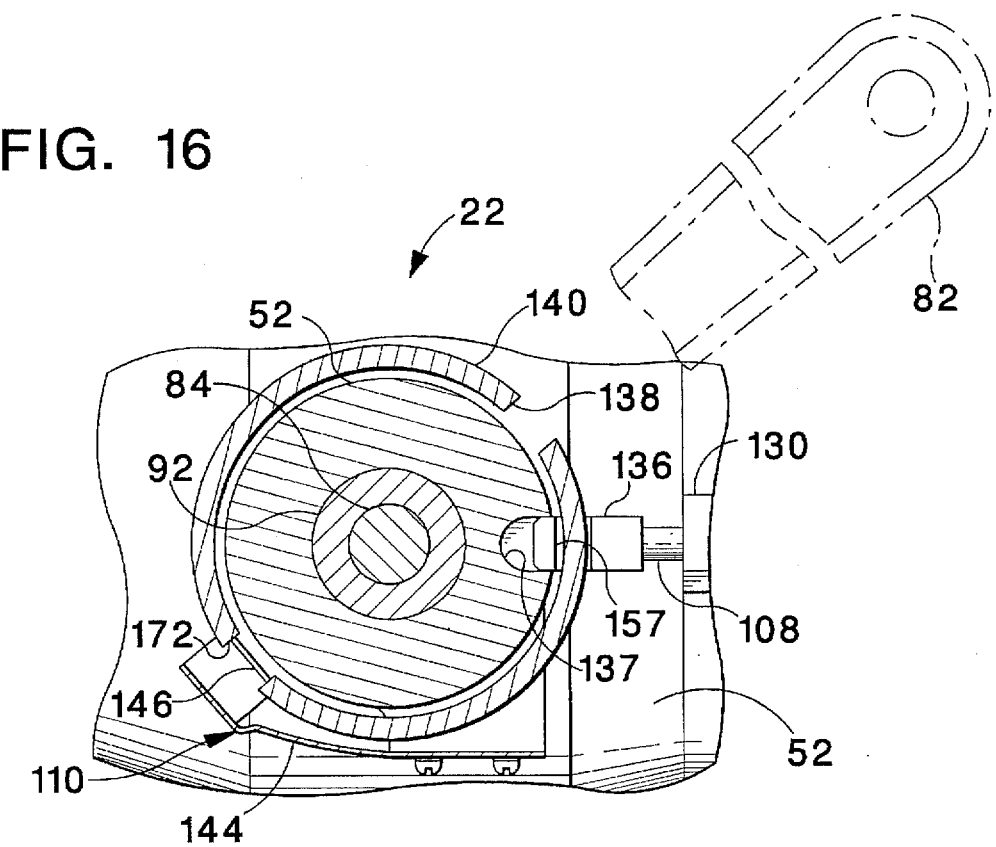
FIG. 16 is a section taken generally on line 16—16 in FIG. 11.
Figure 17:
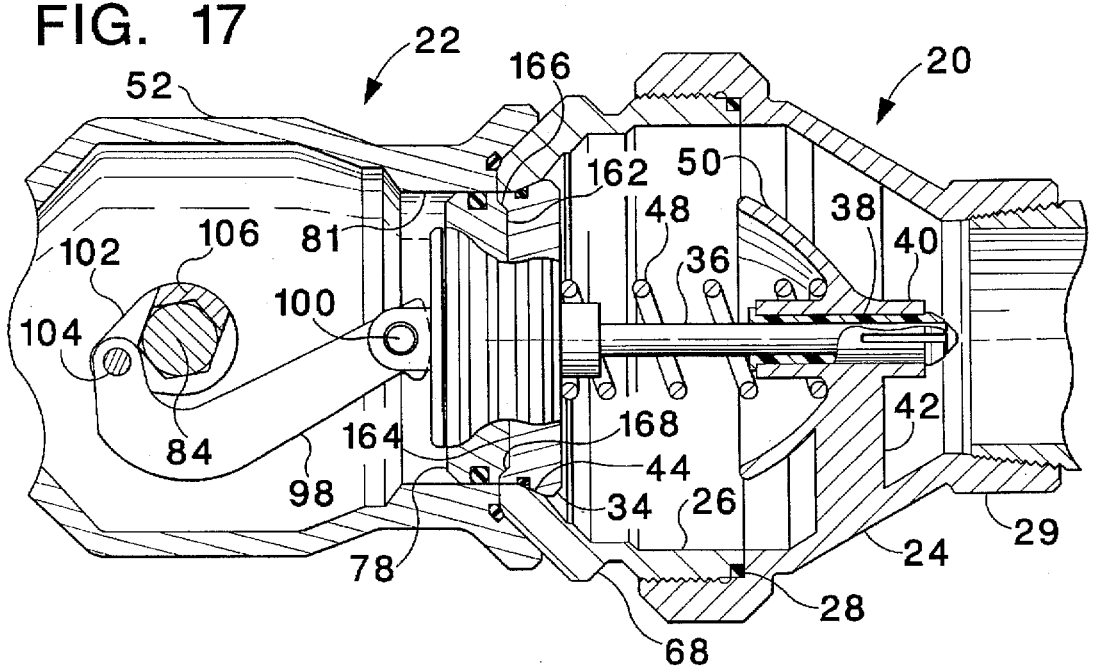
FIG. 17 is a section taken generally on line 17—17 in FIG. 11.

Reference is next made to FIGS. 11, 16 and 17, which illustrates the linkage mechanism after the operating lever 82 has been swing 40° to bring the hub extension surface 158 into underlying relation with the screw 154 and lock the coupler in sealed relation on the adapter. It is to be appreciated that, in this initial, locking movement of the lever 82 (and shaft 84) that there is only minimal axial movement of the valve poppet 78—note that the crank arms 102 swing from one side of center to the other, with very limited axial movement (that would be imparted to the valve poppet 78). In fact, initial rotation of the lever 82 actually retracts the poppet 78 to a slight extent. This provides a further assurance that the adapter poppet 34 will not be prematurely opened before the coupler is fully locked onto the adapter.

It is also to be appreciated that one of the features of the invention is found in the provision of a coupler having a sliding seal, wherein a sealing action is maintained over a finite length of the valve poppet's longitudinal travel, while in engagement with the housing bore 81. This is opposed to the type of valve in which a sealing action is obtained by engagement of a poppet with a definitive seat, as exemplified by the seal 46 in the adapter 20.

Reference is next made to FIGS. 12, 18 and 20, which illustrate rotation of lever 82 to its fully opened position. It is to be appreciated that, as the coupler poppet 78 is displaced from the position of FIG. 17 to the position of FIG. 20, it engages the adapter poppet 34 and displaces it interiorly of the adapter housing, as the coupler poppet 78 is also projected into the adapter housing.

FIG. 20 illustrates the fully open position of the operating lever 82 and the coupler poppet 78. It will be seen that the bell crank pin 104 has been rotated to an "over the center" position, relative to the longitudinal axis of the coupler. This position is established by contact of the link 98 with the shaft 84 and yieldably maintained by the spring 48 of the adapter 20.

A further feature of the invention is found in the provision of coacting guide means on the coupler poppet 78 and the adapter poppet 34 (FIGS. 2, 12 and 20). These means, preferably, take the form of a projecting plug portion 162, formed on the outer end surface of the coupler poppet 78 and a corresponding recess 164 formed in the opposed end face of the adapter poppet 34. More specifically, the plug portion 162 is defined by a frusto-conical surface 166 and the recess is defined by a frusto-conical surface 168. The height of the plug 162 and the depth of the recess 164 are fixed so that engagement between the poppets 78, 34 is at the frusto-conical surfaces 166, 168.

The primary function of the surfaces 166, 168 is to provide support means for the poppet 78, when it is projected to its open position (FIG. 20) beyond the sealing bore 81. It is to be appreciated that the described linkage for displacing the poppet 78 creates only a minimal side loading. This factor, plus interlocking the poppet 78 to adapter poppet 34 enables the coupler poppet 78 to be guided by the adapter poppet shaft 36, in the bearing bushing 38. This manner of supporting the coupler poppet simplifies the coupler construction through simplification of guide means for the coupler poppet.

It has been found that a 45° angle (from a plane normal to the axis of the coupler) for the frusto-conical surfaces 166, 168 is preferred in that a substantially lower angle may fail to provide sufficient lateral support for the coupler poppet, while a substantially higher angle tends to lock the poppets together so that their separation becomes difficult.

It is to be further noted that, the height of the plug 162 and depth of recess 164 are set so that there is a minimal distance between the opposed radial end faces of the poppets. Thus, in addition to providing a guiding function, the plug 162 and recess 164 minimize, if not essentially eliminate, wetting of the end faces of the poppets 78, 34. This is to point out that, when the surfaces 166, 168 are engaged, they tend to block fluid from the main portions of the end faces of the poppets. Thus the only areas of the poppets that will become wetted are the annular bands outwardly of the plug/recess. Thus, when the coupler is disconnected from the adapter, there will be little or no liquid that can become the source of pollution or a hazard.

Reverting to the means for sequencing operation of the valve opening means and the locking means, when the coupler 22 is mounted on the adapter 20, the interlock pin 108 is displaced inwardly bringing the interlock block 136 to a position in which the slot 157 in the block 136, is aligned with the hub extension skirt 140. Rotation of the hub extension is, therefore, no longer blocked by the interlock block 136.

As previously indicated, sequencing of the operation of the valve opening means and locking means is also controlled by the manual release 110. This release comprises a spring steel (or equivalent material) clement that has a plate portion 142 (FIGS. 1, 13 and 14) that is attached to a boss 143 that projects from the coupler housing 52. The release extends from the plate portion by way of an arm 144 that terminates in an inbent, upwardly extending, locking finger 146. In the rest position of coupler (FIG. 13) the finger 146 is yieldingly urged against the inner surface of the hub extension skirt 140. After manually mounting the coupler on the adapter, the lever 82 can then be swung to the ready position of FIGS. 16 and 17. When the lever reaches the position of FIG. 16, the flexed arm 144 flexes outwardly so that the finger 146 enters a radial slot 172.

This arrangement prevents inadvertant opening of the coupling valves 32 and 76. This is to point out that in many, if not most cases, where a coupler is to be mounted on an adapter, it is desired to make certain that a coupler is properly locked on to an adapter, and also to make certain that the system is otherwise in a condition for flow of fluids through the coupling. Inasmuch as a substantial force can be required to lock the coupler on the adapter, the described release means, locks the lever against rotation beyond the ready position, preventing rotation to an extent that would actuate the linkage mechanism for opening the coupler valve 76 and the adapter valve 32.

In order to rotate the lever 82 from the rest position (FIG. 16) to the fully open position of the valves (FIG. 20), it is necessary to press the spring arm 144 inwardly to release the finger 146 from the slot 172. The lever 82 may then be rotated to the fully open position of FIG. 20. When this position is reached, the slot 138 (which coacts with the interlock block 136 in the rest position) is aligned with the manual release finger 146 and the flexed finger snaps into the slot 138. It is thus necessary to again, manually press the arm 144 inwardly and release the finger from the slot 138, before the lever can be swung to close the coupling valves 32, 76, and return the coupling to its ready position (FIG. 16). The finger 146 again snaps into the slot 172, when the lever 82 is returned to the ready position. This prevents inadvertant unlocking of the coupler from the adapter, when it is desired only to shut off flow of fluid through the coupling. It requires the conscientious effort of depressing the manual release arm 144 to swing the lever 82 to the rest position and thereby unlock the coupler from the adapter.

The interaction between the skirt slot 172 and manual release finger 146 also serves to make serves to make it necessary for a conscious decision to be made to open the valve. Thus, the coupler 22 can be locked onto the adapter 20, with reasonable assurance that the valves will be simultaneously opened. This is to point out that, as the lever 82 is swung from the position of FIG. 15, to the position of FIG. 17, the locking finger 146 automatically snaps into the hub extension slot 172 and thus prevents opening of the valves 76, 32, unless the manual release is purposefully depressed.

It is to be appreciated that the lever 82 is also yieldingly maintained in the full flow position, by the "over-the-center" relationship of the crank arm 48 described in connection with FIG. 20. Thus, release of the finger 146, from the slot 138, does not automatically result in self closure of the valves 32, 76, by the spring 48. Closing movement must be initiated by rotation of the lever 82, thereby providing greater manual control of the valves' positions.

Having thus described the invention, what is claimed as novel and desired to be secured by the United States is:

1. A coupling for joining fluid conduits,
    said coupling comprising:
    an adapter and a coupler,
    said adapter comprising
        (a) a housings, said housing having first and second ends and defining a central passageway extending between the first and second ends, the first end of the housing being adapted for connection to a first fluid conduit, the second end of the housing having annular sealing means, and
        (b) a normally closed valve disposed in the housing for selectively blocking the flow of fluid through the central passageway, said valve comprising
            (i) an annular seat adjacent to the second end of the adapter, said seat facing generally toward said first end of the adapter housing,
            (ii) an adapter poppet engageable with said annular seat,
            (iii) spring means for urging said poppet into sealing engagement with said annular seat,
            (iv) a poppet stem extending from the inner side of the poppet towards said first end of the adapter housing, and
            (v) a housing in which the stem is journaled for longitudinal sliding movement,
    said coupler comprising
        (a) a housing, said housing having first and second ends and defining a central passageway extending between the first and second ends, the first end of the housing being adapted for connection to a second fluid conduit, the second end of the housing having annular sealing means that are engageable with the annular sealing means of the adapter, and
        (b) a normally closed valve disposed in the housing for selectively blocking the flow of fluid through the central passageway, said valve comprising
            (i) a coupler poppet, and
            (ii) an annular seat sealingly engaged by the coupler poppet, and
        (c) means for
            (i) mounting the coupler on the adapter with the sealing means of the adapter and the coupler locked in sealed relation, and
            (ii) after the coupler and adapter are so locked, displacing said coupler poppet outwardly from the coupler passageway, to displace the adapter poppet inwardly of the adapter passageway, thus opening both the coupler and adapter valves,
    said coupling further comprising
        interdigitating means
            (i) on the opposed, distal surfaces of the adapter and coupler poppets,
            (ii) for providing a predetermined lateral position of the coupler poppet relative to the adapter poppet,
        whereby the coupler poppet is laterally supported by the adapter poppet and the sliding journal for the adapter poppet stem when the coupler poppet is displaced to an open position in the adapter passageway.

2. A coupling as in claim 1 wherein the interdigitating means comprises
    a frusto-conical projection extending from one of the poppets and
    a frusto-conical recess in the other poppet,
    the angled surfaces of the projection and recess being engaged, when the interdigitating means are engaged.

3. A coupling as in claim 2 wherein the angle of the frusto-conical surfaces approximates 45° and the major diameters of the projection and recess are closely spaced from the outer bounds of the coupler and adapter poppets.

4. A coupling as in claim 1 wherein the coupler valve seat comprises
    a bore in the coupler housing, providing a seat of finite length, that is engaged by the coupler valve poppet, and
    the means for mounting the coupler and displacing said coupler poppet comprise
        (iii) a lever pivotally mounted for movement successively from a rest position to a ready position to a full flow position, and
    in said rest position
        (i) the coupler valve is in a closed position, in said ready position,
        (i) the coupler is mounted on the adapter with the sealing means locked in sealed relation, and
        (ii) the coupler valve is in its closed position, and in said full flow position
        (i) the coupler is mounted on the adapter with the sealing means locked in scaled relation, and
        (ii) the coupler valve is in a fully open position, and
    wherein the means for mounting the coupler and displacing said coupler poppet further comprise
        (iv) a shaft
            (i) spanning the coupler passageway
            (ii) pivotally mounted on the coupler housing,
            (iii) having a portion projecting to the exterior of the coupler housing and (iv) having the lever mounted on said projecting portion, and (v) a crank arm mounted on said shaft, (vi) a link connecting said bell crank and coupler valve poppet, (vii) said crank arm having a position to one side of a longitudinal axis of the coupler housing in the rest position of the lever.

(viii) said crank arm being swung away from the distal end of the coupler as the lever is swung from its rest to its ready position, and (ix) said crank arm being swung toward the distal end of the coupler as the lever is swung toward its full flow position.

5. A coupling as in claim 4 wherein the means for mounting the coupler and displacing said coupler poppet further comprise (x) the crank arm having a position to said one side of the longitudinal axis in which it is engaged by said link, and yieldably maintained in such engagement by the spring means acting on the adapter poppet, thereby establishing the full flow position of the lever.

6. A coupling for joining fluid conduits, comprising:

an adapter having a first end connectable to a first fluid conduit, a second end, an adapter housing extending between the first and second ends and defining a central passageway, and a clamping surface spaced axially inwardly of the second end;

a coupler having a first end connectable to a second fluid conduit, a second end, a coupler housing extending between the first and second ends and defining a central passageway, a pivoted jaw projecting longitudinally beyond the second end, said pivoted jaw being selectively engageable with the clamping surface of the adapter, and a fixed jaw projecting longitudinally beyond the second end, said fixed jaw being engageable with the clamping surface of the adapter; and a locking mechanism for selectively securing the pivoted jaw against the clamping surface of the adapter.

7. A coupling as recited in claim 6 wherein the coupling further comprises a first normally closed valve seated within the central passageway of the adapter, a second normally closed valve seated within the central passageway of the coupler, and a displacement mechanism for displacing the coupler and adapter valves between an open and closed position when the pivoted jaw is secured by the locking mechanism.

8. A coupling as recited in claim 7 wherein the coupling further comprises an interdigitating mechanism located on the coupler and adapter valves for providing lateral support of the coupler and adapter valves when the valves are displaced by the displacement mechanism.

9. A coupling as recited in claim 8 wherein the locking mechanism and the displacement mechanism comprise a lever pivotally mounted for movement successively from a rest position to a ready position to a full flow position and wherein:

in the rest position, the valves are in a closed position and the pivoted jaw may be freely rotated to enable mounting of the coupler to the adapter;

in the ready position, the valves are in a closed position and the pivoted jaw is engaged with the clamping surface; and in the full flow position, the valves are in the open position and the pivoted jaw is locked to the clamping surface.

10. A coupling as recited in claim 9 wherein the coupling further comprises an interlock mechanism for locking the lever in the rest position when the pivoted jaw is not engaged with the clamping surface and for releasing the lever when the pivoted jaw engages the clamping surface.

11. A coupling as recited in claim 10 wherein the coupling further comprises a lever locking mechanism and a manual release mechanism, and wherein the lever locking mechanism prevents movement of the lever from the ready position until the manual release mechanism is manually actuated.

12. A coupling as recited in claim 6 wherein the locking mechanism comprises:

a shaft at least partially spanning the coupler passageway, said shaft being pivotally mounted on the coupler housing and having a portion projecting to the exterior of the coupler housing;

a lever pivotally mounted on said projecting portion for movement successively from a rest position, to a ready position to a full flow position;

a cam member secured for rotation with said shaft, said cam member having a ramp surface adapted to engage the pivoted jaw and swing the jaw toward the clamping surface upon the lever being swung from its rest position, and a positioning surface adapted to maintain the pivoted jaw clamped to the clamping surface as the lever is in the full flow position.

13. A coupling coupler mounted on a coupling adapter, said adapter having a first end connectable to a first fluid conduit, a second end, an adapter housing extending between the first and second ends and defining a central passageway, and a clamping surface spaced axially inwardly of the second end, said coupler comprising:

a first end connectable to a second fluid conduit;

a second end;

a coupler housing extending between the first and second ends and defining a central passageway;

a pivoted jaw projecting longitudinally beyond the second end, said pivoted jaw being selectively engageable with the clamping surface of the adapter; and a fixed jaw projecting longitudinally beyond the second end, said fixed jaw being engageable with the clamping surface of the adapter.

14. An adapter employed in combination with a coupler, said coupler having a first end connectable to a first fluid conduit, a second end, a coupler housing extending between the first and second ends and defining a central passage, a pivoted jaw projecting longitudinally beyond the second end, and a fixed jaw projecting longitudinally beyond the second end, said adapter comprising:

a first end connectable to a first fluid conduit;

a second end;

an adapter housing extending between the first and second ends and defining a central passageway; and a clamping surface spaced axially inwardly of the second end, said clamping surface being engageable with said pivoted jaw.

15. A coupling for joining fluid conduits, comprising:

an adapter having a first end connectable to a first fluid conduit, a second end, an adapter housing extending between the first and second ends and defining a central passageway, and a clamping surface spaced axially inwardly of the second end;

a coupler having a first end connectable to a second fluid conduit, a second end, a coupler housing extending between the first and second ends and defining a central passageway, and a plurality of jaws projecting longitudinally beyond the second end, said jaws being selectively engageable with the clamping surface of the adapter, at least one of said jaws being pivotally mounted with respect to the coupler housing; and a locking mechanism for selectively securing the plurality of jaws against the clamping surface of the adapter, said locking mechanism comprising:

a shaft at least partially spanning the coupler passageway, said shaft being pivotally mounted on the exterior surface of the coupler and having a portion projecting therefrom, a lever pivotally mounted on said projecting portion for movement successively from a rest position to a ready position to a full flow position, and a cam member secured for rotation with said shaft, said cam member having:

a ramp surface adapted to engage at least one pivoted jaw and swing the jaw toward the clamping surface upon the lever being swung from its rest position, and a positioning surface to maintain the pivoted jaw clamped to the clamping surface as the lever is swung to the full flow position.

16. A coupling as recited in claim 15 wherein said plurality of jaws includes at least one jaw that is fixedly secured with respect to the coupler housing.

* * * * *

UNITED STATES PATENT AND TRADEMARK OFFICE
CERTIFICATE OF CORRECTION

PATENT NO. : 5,671,777
DATED : September 30, 1997
INVENTOR(S) : Daniel M. Allen, et al.

It is certified that error appears in the above-identified patent and that said Letters Patent is hereby corrected as shown below:

Column 2, line 18, replace "damped" with --clamped--.
Column 4, line 12, after "coupler", insert --22--.
Column 11, line 21, delete "serves to make".

In the claims:
Column 11, line 44, replace "housings" with --housing--.

Signed and Sealed this

Twenty-eighth Day of April, 1998

Attest:

BRUCE LEHMAN

Attesting Officer

Commissioner of Patents and Trademarks